United States Patent [19]

Heinen

[11] Patent Number: 4,613,141

[45] Date of Patent: Sep. 23, 1986

[54] HYDROSTATIC AND HYDRODYNAMIC SEAL FOR ROTATING A ROTATING SHAFT

[75] Inventor: Manfred Heinen, Rees, Fed. Rep. of Germany

[73] Assignee: M.A.N. Maschinenfabrik Augsburg-Nürnberg AG, Fed. Rep. of Germany

[21] Appl. No.: 811,481

[22] Filed: Dec. 20, 1985

[30] Foreign Application Priority Data

Dec. 22, 1984 [DE] Fed. Rep. of Germany ....... 3447102

[51] Int. Cl.4 .......................... F16J 15/34; F16J 15/46
[52] U.S. Cl. ...................................... 277/27; 277/26; 277/81 R; 277/85
[58] Field of Search .................... 277/38–41, 277/81 R, 93 SD, 82, 26, 93 R, 85, 27, 94

[56] References Cited

U.S. PATENT DOCUMENTS

| | | | |
|---|---|---|---|
| 2,089,773 | 8/1937 | Vedovell et al. | 277/38 |
| 2,374,353 | 4/1945 | Jacobsen | 277/87 |
| 2,509,912 | 5/1950 | Eliasson | 277/81 R X |
| 3,079,605 | 2/1963 | Thomas et al. | 277/27 |
| 3,480,284 | 11/1969 | Voitik | 277/41 X |
| 4,277,072 | 7/1981 | Forch | 277/85 X |
| 4,471,964 | 9/1984 | Kotzur | 277/27 X |

FOREIGN PATENT DOCUMENTS 434880 10/1967 Switzerland .............. 277/27

Primary Examiner—Robert S. Ward
Attorney, Agent, or Firm—McGlew and Tuttle

[57] ABSTRACT

A hydrostatic or hydrodynamic shaft seal comprises a ring revolving with the shaft and an axially movable static ring which is sealed against the housing by two O-rings and forms, with the revolving ring, radial seal gaps. An incompressible fluid flows and stabilizes the seal gaps and the static seal ring has a cavity for receiving the stopping or cooling liquid. A number of tensioning spring elements are arranged on the circumference or end of the static ring which take support against a ring which serves as a pressure limiting valve.

4 Claims, 5 Drawing Figures

HYDROSTATIC AND HYDRODYNAMIC SEAL FOR ROTATING A ROTATING SHAFT

FIELD AND BACKGROUND OF THE INVENTION

This invention relates in general to the construction of shaft seals and in particular to a new and useful hydrostatic and hydrodynamic shaft seal for a rotating shaft.

The invention relates particularly to a hydrostatic or hydrodynamic shaft seal, including a ring revolving with the shaft and an axially movable static ring which is sealed from the housing by two O-rings, and forms, with the revolving ring, radial seal gaps through which an incompressible fluid flows and stabilizes the seal gap. Such shaft seals for compressors and other machines must seal the process spaces in the zone of the shaft passage through the housing from the atmosphere and insure that only very little stopping medium gets into the process space.

Such seals include a ring revolving with the shaft and a static seal ring which is pressed against the end face of the revolving ring and with it forms the seal gap. With the hydrostatic principle for supplying stopping medium into the seal gap, the static seal ring has three or more throttle elements, which lead into as many pockets concentrically distributed over the circumference. From these pockets the stopping medium flows to both sides through the seal gap outwardly into the process space and inwardly into the atmosphere. thus, independently of the stopping medium pressure, a seal gap may occur which, during operation, avoids metallic contact of the two rings and stabilizes itself by the interaction of stopping medium throttle throughput and gap throughput.

Due to the automatic stabilization of the seal gap, minimal gaps and hence minimal stopping medium throughputs can be achieved, which, in most known seal designs, are very difficult to realize, for manufacturing and physical reasons, without getting to the limits of operational safety.

The samll quantities of stopping medium of known hydrostatic and hydrodynamic seals are, however, unable to remove the friction heat created in the gap during operation. The seal rings must be cooled from the outside if overheating in the gap is to be avoided. But thereby the usability of these known seal types is limited to low circumferential speeds in the seal area.

It is the object of the invention to substantially increase the safe speed range in a hydrostatic or hydrodynamic shaft seal.

The invention solves this problem in the manner as stated in the characteristics of the patent claims. The seal according to the invention has an intensive internal cooling, which permits using it also in speed ranges at which turbocompressors and other high-speed machines are operated.

Accordingly it is an object of the invention to provide an improved seal for a rotating shaft which includes a revolving ring revolving with the shaft and a static ring which is movable only axially in respect to the shaft and forms radial seal gaps with the revolving ring and which includes a pair of axially spaced O-rings sealing the static ring with the housing and permitting its axial mobility, the static ring with the revolving ring form radial gaps for the flow of an incompressible fluid therethrough having a flowthrough valve passage into which a valve ring member extends so as to control the pressure on the fluid which flows through the cavity of the static ring and for this purpose the valve ring is biased by spring.

A further object of the invention is to provide a shaft seal which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
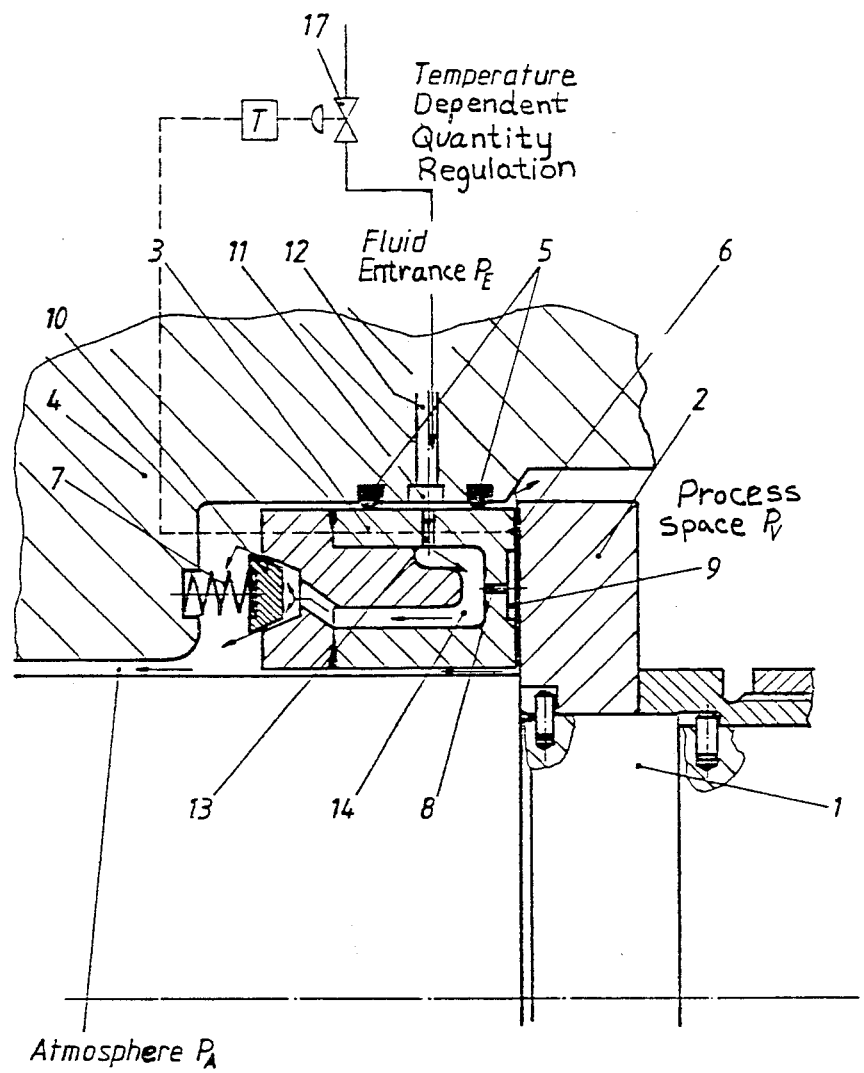
FIG. 1 is a longitudinal sectional view of a shaft seal constructed in accordance with the invention.

Referring to the drawing in particular the invention embodied therein comprises a hydrostatic and/or hydrodynamic seal for a rotating shaft 1 which comprises revolving ring 2 revolving with the shaft 1 and a static ring 3 movable only axially in respect to the shaft 1 and forming a radial seal gap with the revolving ring. A housing 4 supports the shaft for rotation and a pair of axially spaced O-rings 5,5 seal the static ring with the housing and permit its axial mobility. The static ring 3 with the revolving ring 2 forms radial gaps with the flow of an incompressible fluid therethrough which also flows through a cavity 14 of the static ring 3. Spring means including a spring 7 which may be adjustable bears against a valve ring member 10 which seats at an end of the static ring and limits the pressure of the fluid.

The static seal ring 3 of the shaft seal according to FIG. 1 comprises two parts welded together. The stopping medium is supplied via a bore 12 into a contiguous distributor groove 11 and reaches a cavity 14 of the static seal ring 3 via a number of bores 13 distributed over the circumference. Two O-rings 5 seal the static seal ring 3 against the housing 4 and ensure its axial mobility.

To generate a required pressure $p_T$ in the pockets 9, which, to maintain the blocking medium stream in the seal gap, must be higher than the highest counter-pressure to both sides of the seal ara, a tensioning force is applied via spring elements 7 distributed over the circumference, which elements take support on a ring 10 which also serves as a pressure-limiting valve.

When an adjusted maximum stopping medium inlet pressure is reached which corresponds to the pressure before the throttle element 8, a valve or valve ring 10 opens. Except for slight increases of the friction and throttle losses, further increase of the stopping medium throughput has little effect on the admission pressure of the throttle point.

As the entire stopping medium stream is passed along the back of the seal area, there results thus a controllable cooling of the gap zone without exertion of influence with regard to the pressure and flow conditions. The opening force of the pressure limiting valve, once adjusted, not only establishes the pressure $p_E$ before the throttle point, but as a reaction force on the pressure buildup in the seal gap it also determines the pocket pressure $p_T$ which must be higher than the process pressure $p_V$ (see FIG. 2).

Figure 3:
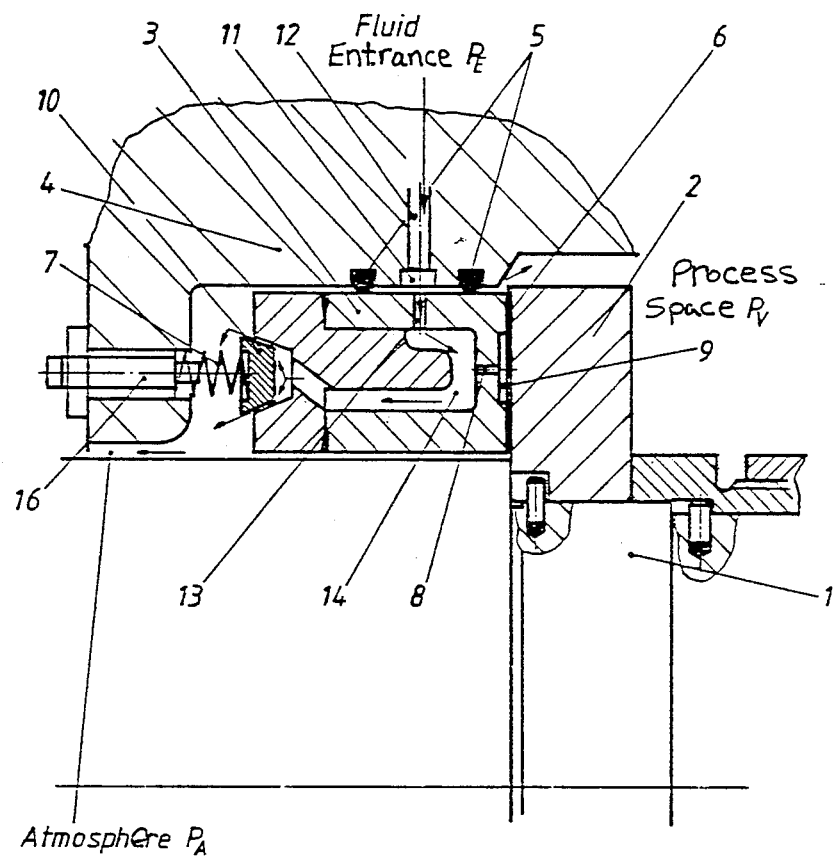
FIG. 3 is a longitudinal sectional view of the shaft seal with adjustment means.

To be able to vary the pressures before the throttle points in the gap, the spring force of the spring 7, can be adjusted through an adjusting means 16 accessible from the outside as shown in FIG. 3.

Figure 2:
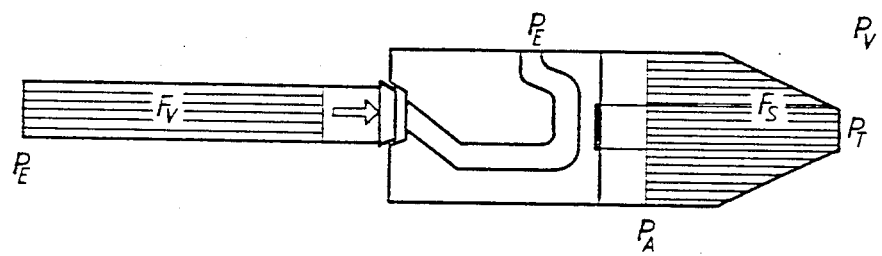
FIG. 2 is a pressure load diagram relating to FIG. 1.

FIG. 2 shows that the design according to FIGS. 1 and 3 can be used in the low-pressure range to about 5 bars, since at higher pressures for maintaining the equilibrium of forces $F_V = F_S$ the pressure $p_E$ before the throttle becomes so high that the stopping medium throughput through the seal gap increase impermissibly.

Figure 4:
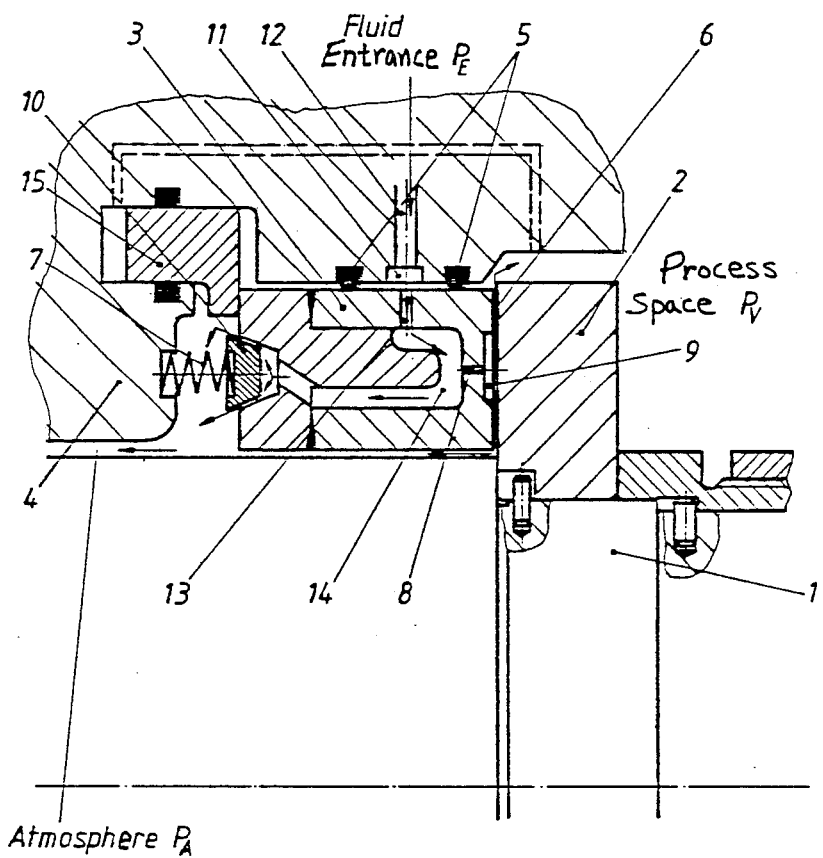
FIG. 4 is a longitudinal sectional view of the shaft seal with hydraulic load.
Figure 5:
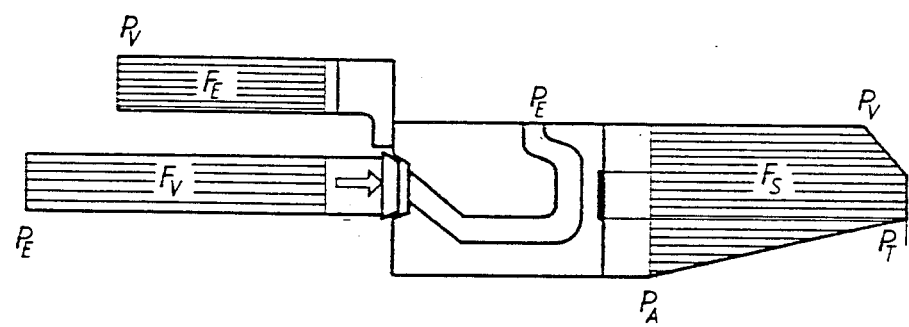
FIG. 5 is a pressure load diagram relating to FIG. 4.

For higher pressure ranges, a design as shown in FIG. 4 is suitable. Here a partial hydraulic relief of the pressure limiting valve is obtained by an annular piston 15, so that adaptation of the throttle admission pressure to optimum values becomes possible (see FIG. 5).

The described internal cooling of the static seal ring 3 by means of the stopping medium stream makes possible, with a thermostatic stopping medium quantity control 17, a stable temperature regulation in the seal area.

The hydrodynamic shaft seal (not shown) involves merely an internal cooling. The stopping medium stream is not influenced, as in this design there are no throttle elements 8 and pockets 9.

While specific embodiments of the invention have been shown and described in detail to illustrate the application of the principles of the invention, it will be understood that the invention may be embodied otherwise without departing from such principles.

What is claimed is:

1. A hydrostatic and hydrodynamic seal for a rotating shaft, comprising a revolving ring revolving with the shaft, a static ring movable only axially in respect to the shaft and forming radial seal gaps with said revolving ring, a housing supporting the shaft, a pair of axially spaced O-rings sealing said static ring with said housing and permitting the axial mobility of said static ring, said static ring with said revolving ring forming radial gaps for the flow of an incompressible fluid therethrough and having a liquid flow cavity for the fluid with an end passage, a valve ring engageable in the end passage, and spring means biasing said valve ring into the flow-through end passage for limiting the pressure of the fluid.

2. A shaft seal according to claim 1, including adjusting means accessible from the outside providing adjustment of said spring means.

3. A shaft seal according to claim 1, wherein said valve ring comprises an annular piston for partial hydraulic release of the static seal ring.

4. A shaft seal according to claim 1, including a thermostatic stopping medium quantity control connected to said passage for controlling temperature of the fluid flowing through said seal gaps.

* * * * *